Dec. 16, 1969  R. L. LITLE ET AL  3,483,990
DIALYZER APPARATUS
Filed March 6, 1967  4 Sheets-Sheet 1
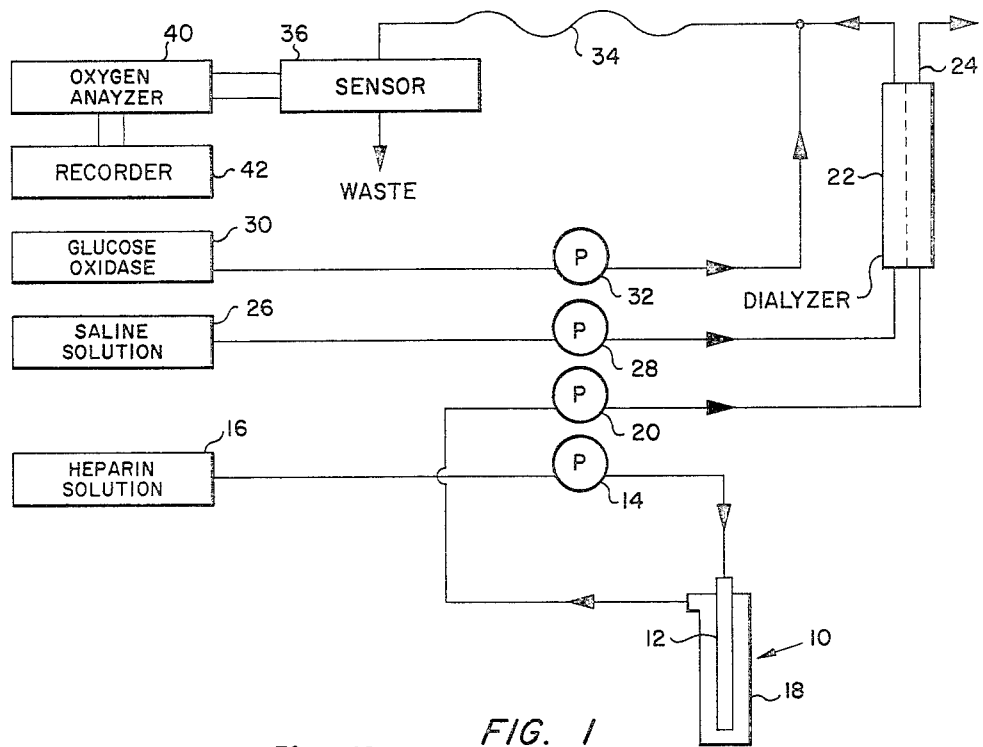
FIG. 1
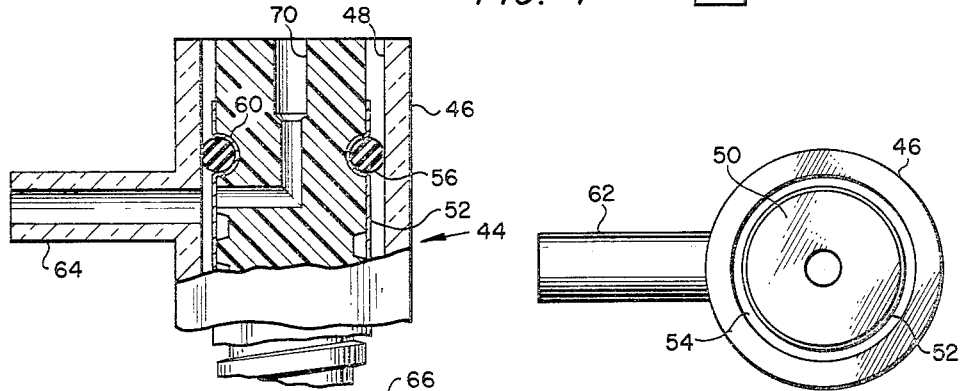
FIG. 2
FIG. 3
ROBERT L. LITLE
JAMES C. STERNBERG
RUDOLF DEURINGER
INVENTORS
BY Thomas L. Peterson
ATTORNEY

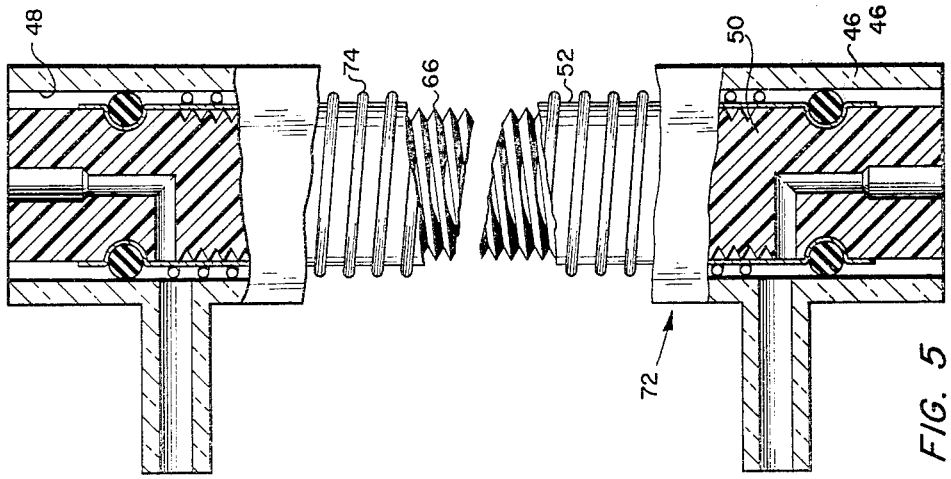
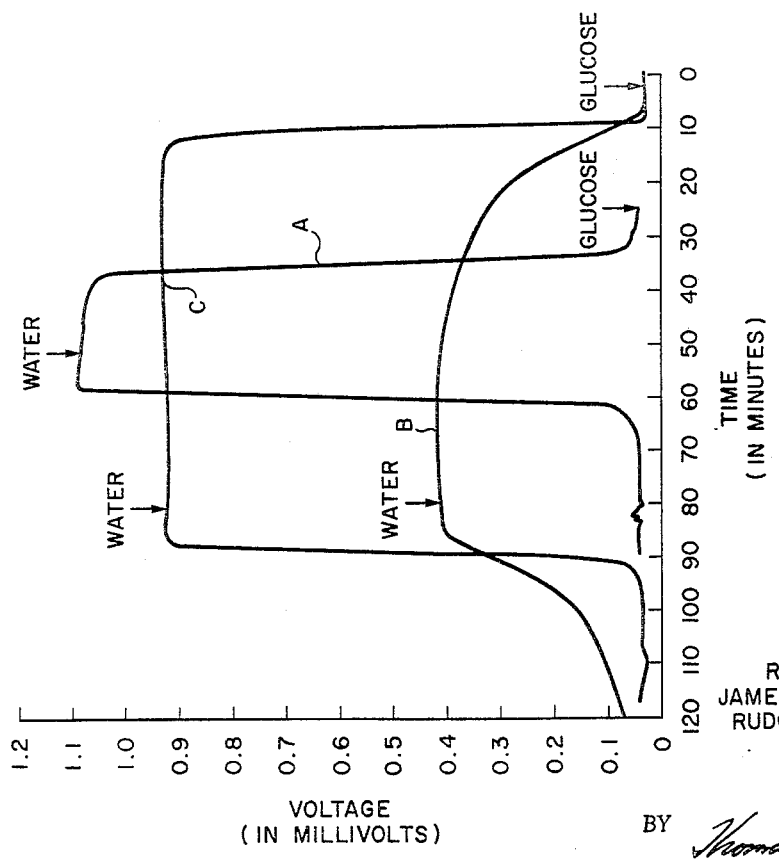

Dec. 16, 1969  R. L. LITLE ET AL  3,483,990
DIALYZER APPARATUS
Filed March 6, 1967  4 Sheets-Sheet 3
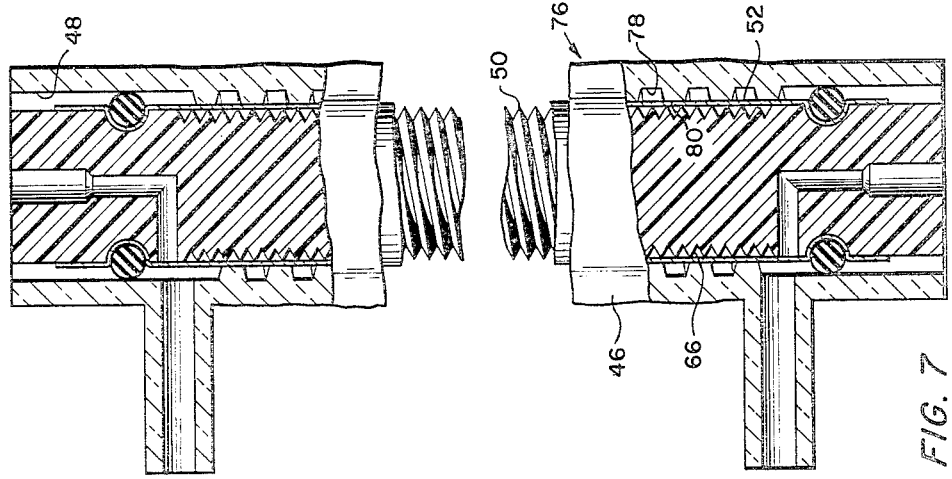
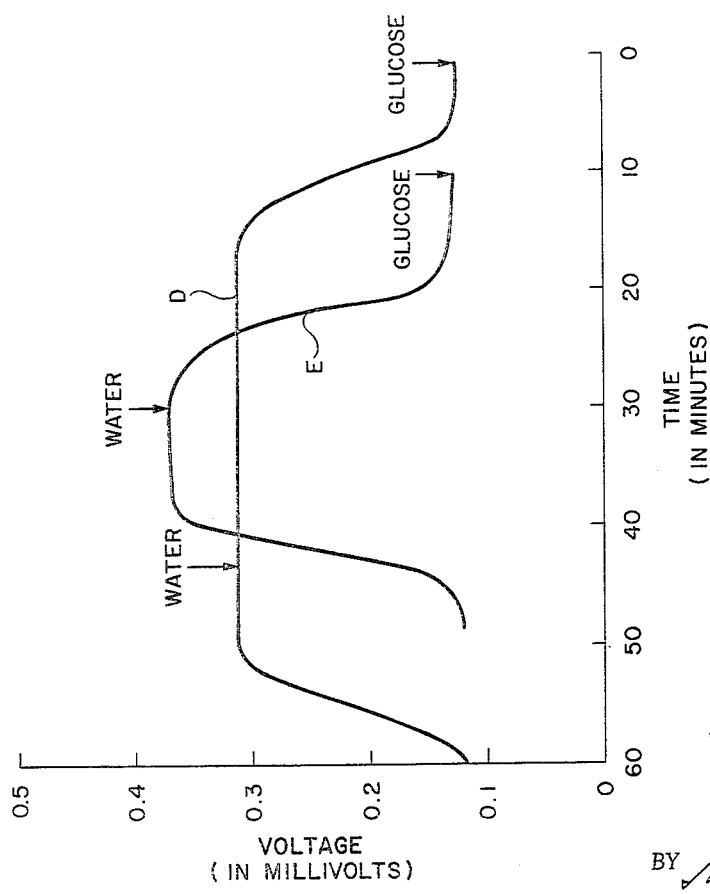
ROBERT L. LITLE
JAMES C. STERNBERG
RUDOLF DEURINGER
INVENTORS
BY *Thomas L. Peterson*
ATTORNEY

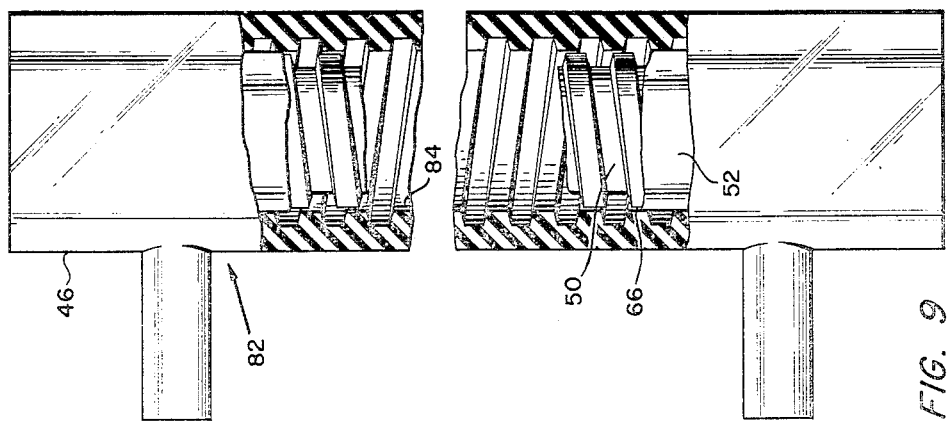
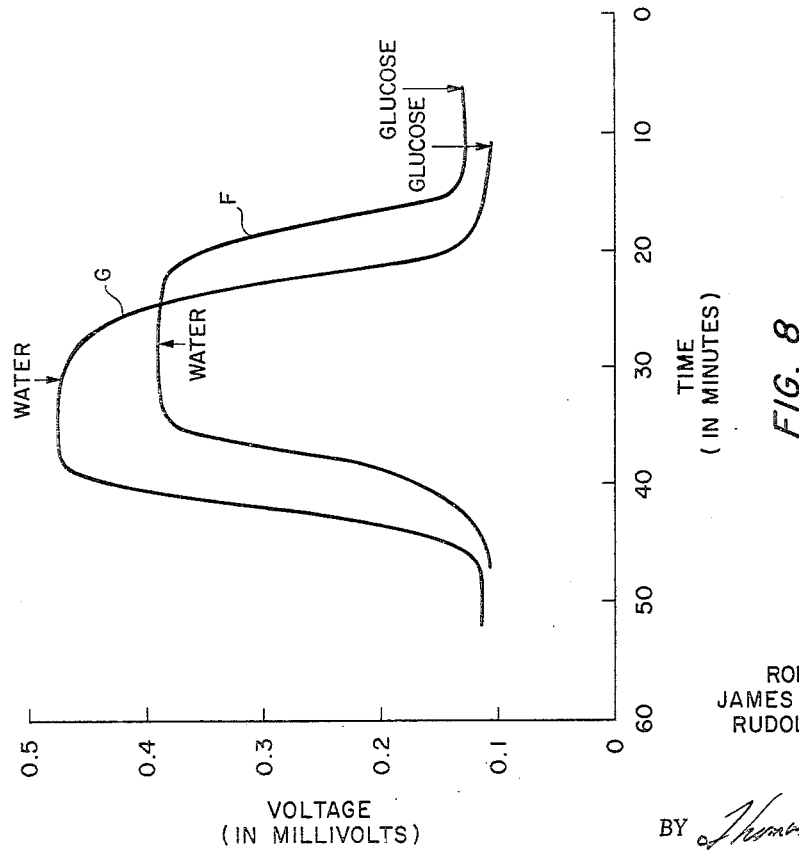

United States Patent Office 3,483,990
Patented Dec. 16, 1969

1

3,483,990
DIALYZER APPARATUS
Robert L. Litle, Chino, James C. Sternberg, Fullerton, and Rudolf Deuringer, El Toro, Calif., assignors to Beckman Instruments, Inc., a corporation of California
Filed Mar. 6, 1967, Ser. No. 620,976
Int. Cl. B01d 13/00
U.S. Cl. 210—321                                3 Claims

---

ABSTRACT OF THE DISCLOSURE

A dialyzer apparatus of the type employing a cylindrical dialysis membrane wherein liquid flow paths are provided along the inner and outer surfaces, respectively, of the membrane. Means are provided so that the liquid on one or both sides of the membrane will flow in a helical path about the membrane so as to provide high membrane contact area per unit volume of liquid in a compact, lightweight unit. The dialyzer is particularly suited for use in an analytical instrument which continuously monitors glucose concentration of blood.

---

This invention relates to a dialyzer apparatus and, more specifically, to a dialyzer which is particularly advantageous for use in an analytical instrument that continuously monitors a dialyzed component of a solution.

There are many applications for dialyzers. One application for a dialyzer is in continuous extracorporeal blood dialysis in which the dialyzer functions continuously to purify the blood by dialysis, the blood being withdrawn from the body of a human being for conditioning or purification and then returned to the body after it has been acted upon by the dialyzer. Another application for a dialyzer is in certain instruments employed for continuously monitoring biological fluids wherein dialysis is required to separate low molecular weight analytes from high molecular weight interfering substances, such as proteins. An example of such an analysis is the continuous monitoring of the glucose concentration of blood in which case the glucose must be separated from the blood by dialysis. An instrument suitable for continuously monitoring the glucose concentration of blood is described in copending patent application of Arnold H. Kadish et al. entitled "Polarographic Analysis Systems and Methods of Performing Polarographic Analyses," Ser. No. 414,685, filed Nov. 30, 1964, and assigned to the assignee of the present application. The dialyzer of the present invention is particularly advantageous for use in the second application mentioned hereinabove, namely, in a continuous analytical instrument for monitoring a dialyzable component of a liqued; however, it is understood that the dialyzer may be utilized in any application wherein dialyzable components must be separated from a liquid.

In the continuous monitoring of the glucose concentration of blood of a patient it is sometimes desirable to mount the monitoring instrument directly on the back of the patient so that the instrument may be worn in a variety of ambulatory situations. In such a case, the instrument must be self-contained, battery operated and sufficiently light and compact to permit the instrument to be worn by the patient. Accordingly, it is necessary that the various components of the instrument, including the dialyzer, be light-weight and compact, yet without sacrificing the efficiency of the components so that accurate research and diagnostic examinations may be conducted on the patient.

It is, therefore, the principal object of the present invention to provide a compact, light-weight dialyzer which

2 has a large membrane contact area per unit volume of solution.

According to the principal aspect of the present invention, there is provided a dialyzer which is constructed to provide liquid flow paths along the inner and outer surfaces of a cylindrical dialysis membrane wherein one or both of the flow paths are shaped to provide a helical flow of liquid along the surface of the membrane. This arrangement permits a light-weight, compact unit which has a large membrane contact area per unit volume of liquid so that the functional characteristics of the dialyzer are comparable to that of substantially larger and heavier dialyzers.

These and other objects and advantages will become apparent from the following description taken in connection with the accompanying drawings wherein:

FIG. 1 is a schematic showing of a glucose monitor in which the dialyzer of the present invention may be employed;

FIG. 2 is an enlarged, fragmentary, partial sectional view along the longitudinal axis of one form of the dialyzer of the invention;

FIG. 3 is an end view of the dialyzer illustrated in FIG. 2;

FIG. 4 is a graph illustrating the dialysis characteristics of a prior art dialyzer and of the dialyzers illustrated in FIGS. 2 and 9;

FIG. 5 is an enlarged, fragmentary, partial sectional view along the longitudinal axis of a modified form of the dialyzer of the invention;

FIG. 6 is a graph illustrating the dialysis characteristics of the dialyzer illustrated in FIG. 5;

FIG. 7 is an enlarged, fragmentary, partial sectional view along the longitudinal axis of still another form of the dialyzer of the invention;

FIG. 8 is a graph illustrating the dialysis characteristics of the dialyzer illustrated in FIG. 7 and of a different type of prior art dialyzer; and FIG. 9 is an enlarged, fragmentary, partial sectional view along the longitudinal axis of the preferred form of the dialyzer of the invention.

Referring now to the drawings in detail, wherein like reference characters designate like or corresponding parts throughout the various views, there is shown schematically in FIG. 1 a glucose monitoring system which may incorporate the dialyzer of the present invention, such system being described in detail in the aforementioned Kadish et al. patent application. The glucose monitoring system is based upon the oxidation of glucose to gluconic acid by dissolved elemental oxygen in the presence of the enzyme glucose oxidase. The corresponding decrease in oxygen is measured by means of a polarographic oxygen sensor.

More specifically, the system comprises a dual lumen catheter 10 adapted for insertion into the patient's vein. Catheter 10 includes an inner lumen 12 supplied with a solution of heparin in isotonic saline by means of a peristaltic pump 14 and reservoir 16. The combined heparin solution and sample blood is withdrawn from the outer lumen 18 of the catheter by pump 20 through a dialyzer 22 and may be vented to waste, collected, or returned via line 24 and a single lumen catheter (not shown) to the patient's vein. Reservoir 26 contains an isotonic saline solution which is pumped through the other side of the dialyzer 22 by a pump 28 in a direction the same as that of the blood. It is understood, however, that the blood and saline solutions may be caused to flow in opposite directions through the dialyzer to obtain a countercurrent flow effect, if desired.

The glucose being monitored passes by dialysis from the blood-heparin mixture to the isotonic saline solution and is mixed with glucose oxidase from a reservoir 30 and pump 32 at the input of a delay line reaction chamber 34. At the outlet of the reaction chamber there is connected a polarographic oxygen sensor 36 which determines the amount of oxygen remaining in the solution after the reaction, the tested solution being delivered from the sensor 36 to waste. The electrical output of the sensor 36 is connected to an oxygen analyzer 40 which drives a recorder 42. Accordingly, the system provides the continuous monitoring of the dissolved oxygen level of the solution leaving the reaction chamber 34 and, consequently, of the glucose concentration of blood being sampled.

It is one of the purposes of the present invention to provide a dialyzer which is both compact and light-weight, yet has acceptable efficiency, that is, the magnitude of the sensor output 36 as indicated by the height of the trace of the pen on the recording chart of recorder 42 is essentially the same as that of previously available dialyzers of substantially greater size and weight when other conditions are substantially the same. Even more important than the efficiency of the dialyzer is the fidelity or shape of the trace produced by the recorder pen and the delay characteristics of the dialyzer. By the term "fidelity," reference is made to the comparison of the trace of the recorder 42 to the concentration of glucose being monitored. For example, when the glucose concentration of a solution is changed in a sharp step, it would be desirable that the recording pen move in a similar sharp step response in a transverse direction rather than along a gradually sloping curve; the latter behaviour is sometimes referred to as "tailing." The better the approximation of the response to the input change, the better the fidelity. The fidelity is to be regarded as separate from the inherent delay time required for the glucose to reach the dialyzer and for the dialyzed glucose-containing saline to reach the sensor. This delay time, of course, is the time difference between the change in concentration of glucose and the subsequent corresponding change in the movement of the pen of the recorder 42. Another purpose of the invention is to provide a dialyzer which, when employed in an analytical instrument, makes a minimum contribution to the delay time and causes a recorder trace to be formed that has high fidelity.

Illustrated in FIGS. 2 and 3 is one form of the dialyzer of the invention, which may be constructed as a compact, light-weight unit, yet has an efficiency comparable to that of larger, conventional dialyzers and when used in the system illustrated in FIG. 1 results in the formation of traces on the recorder strip chart which have high fidelity and short delay time. The dialyzer in FIGS. 2 and 3, generally referred to by numeral 44, comprises a housing 46 having a cylindrical recess therethrough 48. Positioned coaxially within the recess 48 is a cylindrical core 50. A cylindrical dialysis membrane 52, preferably cellophane, surrounds the core 50 and is secured thereto adjacent the ends of the core by means of rubber O-rings 54 and 56 engaged in annular grooves 58 and 60, respectively, formed adjacent to the ends of the core. The housing 46 includes inlet and outlet ports 62 and 64 positioned near the opposite ends of the housing and between the O-rings 58 and 60. The outer surface of the membrane 52 is spaced slightly from the wall of the recess 48 so as to define between the inlet and outlets 62 and 64 an annular flow path along the surface of the membrane. In accordance with the invention, the core 50 is formed with a screw thread 66 so as to define a helical flow path along the inner surface of the membrane 52. As seen in the drawing, the inner surface of the membrane 52 abuts directly against the peak of the screw thread 66 so that the two are in sealing relationship thus preventing liquid flowing through the helical path defined by the screwthread 66 from crossing from one convolution of the thread to the next. Inlet and outlet passages 68 and 70 in the ends of the core 40 open up at the surface of the core at opposite ends of the screwthread 66 and between the grooves 58 and 60 thereby permitting the flow of liquid into the inlet passage 68, through the helical path defined by the screwthread 66 and out from the other end of the dialyzer via the outlet passage 70.

A dialyzer as illustrated in FIG. 2 has been constructed in which the core 50 was formed of Teflon, a polytetrafluoroalkane, with a screwthread formed in its outer surface to give a final outer diameter of 0.64 inch. The Teflon core was inserted into a wetted, 0.60 inch diameter tubular cellophane membrane having a thickness of 0.0025 inch. The housing 46 was formed of glass and had an outer diameter of about ¾ inch and a length of approximately 4 inches. The dialyzer weighed 58 grams. Such a dialyzer was employed in the glucose monitoring system illustrated in FIG. 1 with samples of water and 300 milligram percent glucose being employed to test the characteristics of the dialyzer. Since glucose is not subject to clotting, as is blood, the heparin solution was replaced by a normal saline solution. The pumps 20 and 28 were operated to provide a flow rate of 0.4 cc./min. of solution while the pump 32 was operated to provide a flow rate of 2 cc./min. of glucose oxidase. The trace A in the graph illustrated in FIG. 4 shows the characteristics of the glucose monitoring system employing the dialyzer illustrated in FIGS. 2 and 3, the abscissa in the graph shown in FIG. 4, as well as in FIGS. 6 and 8, being time in terms of minutes, while the ordinate of the graphs is voltage in terms of millivolts.

Also shown in FIG. 4 is trace B of a dialyzer of a type known in the prior art, namely, one employing a cylindrical dialysis membrane and constructed to provide annular flow paths along both the inner and outer surfaces of the membrane. The specific dialyzer utilized to produce trace B in FIG. 4 was of exactly the same construction as the dialyzer in FIG. 2 except that the screwthread 66 on the core 50 was ground away to provide a smooth cylindrical surface whereby an annular flow path was provided between the surface of the core and the inner surface of the membrane 52.

In the tests on the two aforementioned dialyzers, the sample was caused to flow along the inner surface of the cylindrical membrane 52 while the saline solution was caused to flow along the outer surface of the membrane in the same direction to provide co-current dialysis. In the case of the prior art type dialyzer, the sample was 200 milligram percent glucose. However, the electrical controls of the monitoring system were set to cause the traces to be on equal scale and, therefore, directly comparable.

In each of the traces in the graph shown in FIG. 4, arrows indicate when the catheter of the glucose monitoring apparatus was immersed in a beaker of glucose and, thereafter, in a beaker of water thereby providing immediate step changes in the glucose concentration of the sample being analyzed. In comparing traces A and B in FIG. 4, it is noted that the height of trace A is substantially greater than that of trace B, thus showing that the efficiency of the dialyzer shown in FIG. 2 employing the screwthread 66 was greater than that of a dialyzer having annular flow along both sides of the cylindrical membrane. Also, the fidelity of trace A is substantially higher than that of trace B inasmuch as trace A shows virtually no "tailing," that is to say, the portions of the trace between the base and its peak is almost vertical. It is believed that the reason that the dialyzer as shown in FIGS. 2 and 3 has more favorable characteristics than the prior art type dialyzer is that in the latter the flow of fluid tends to be confined to one side of both of the annular flow channels while the screwthread arrangement of the present invention provides a larger membrane contact area per unit volume of liquid with a complete sweep out of bubbles and previous sample in the flow path. Traces A and B in FIG. 4 can be compared with trace C which depicts the characteristics of the preferred form of a dialyzer of the invention illustrated in FIG. 9, which will be described in detail later. It is seen that trace C is almost ideal as far as fidelity is concerned, that is, the trace closely follows the concentration level of glucose being monitored by the glucose monitoring system. Trace A is not as favorable as trace C due to the slope of the top of trace A, showing a slow upward drift in response which may be due to slow diffusion of sample in the annular flow path. The traces A, B and C were produced under almost identical conditions except for the dialyzer being employed and glucose concentration, which was accommodated by appropriately setting the controls of the monitor. The traces are superimposed one upon the other in FIG. 4 for purposes of comparison, it being understood that the traces on the actual recorder strip chart were spaced apart.

Reference is now made to FIG. 5 wherein there is illustrated a modified form of the dialyzer of the invention, generally referred to by numeral 72. The dialyzer 72 is identical to that illustrated in FIG. 2 except that there is provided between the outer surface of the membrane 52 and the wall of the recess 48 a spiral wire which abuts in sealing relationship with both the membrane and wall of the recess, thereby defining a helical flow path for fluid along the outer surface of the membrane 52. Thus, in this embodiment of the invention helical flow paths are provided along both the inner and outer surface of the cylindrical membrane.

As seen in FIG. 5, the pitch of the convolutions of the spiral wire 74 is opposite to the pitch of the screwthread 66, that is, the screw thread 66 is righthanded while the spiral wire provides a lefthanded screwthread. This arrangement has the advantage that it eliminates the blocking of the effective membrane area which could result if the core 50 and housing 46 with the threads extending in the same direction were moved axially with respect to one another.

A dialyzer as illustrated in FIG. 5 has been constructed employing a screwthreaded Teflon core 50 having a diameter of 0.252 inch and a glass housing 46 having an outer diameter of about ⅜ inch. The dialyzer was 8.5 inches long and weighed 26 grams. The outer helical flow path was provided by a spiral stainless steel wire placed between the membrane 52 and the wall of the recess 48. The tubular membrane was formed of cellophane, had a diameter of 0.25 inch and a thickness of 0.0025 inch.

Such a dialyzer was tested in a glucose monitoring system as described above with the flow of the various fluids in the system being identical; however, the concentration of the glucose was 159 milligram percent. Traces D and E in the graph illustrated in FIG. 6 depict the characteristics of the aforementioned dialyzer of the type shown in FIG. 5, the traces being superimposed one upon the other for purposes of comparison. Trace D was produced when the sample was flowing along the outer surface of the membrane 52 while the saline solution was flowing along the inner surface of the membrane in the opposite direction so as to provide countercurrent dialysis. Trace E was produced by the dialyzer 72 with the sample flowing along the outside of the membrane 52 and the saline solution along the inside thereof, but with both solutions flowing in the same direction to provide co-current dialysis. It is to be undersood that traces D and E cannot be compared with traces A, B and C insofar as efficiency is concerned since the height of the traces was dependent upon the settings of the electrical controls of the glucose monitor, which varied in the two tests, yet such settings had no effect on the fidelity of the traces, which can be accurately compared. Comparing the traces in FIGS. 4 and 6, it is seen that the fidelity of traces D and E is greatly improved over trace B thus again showing that the provision of a helical flow path along both surfaces of the cylindrical membrane 52 provides a dialyzer having improved characteristics over one having annular flow paths along both surfaces of a cylindrical dialysis membrane.

FIG. 7 shows still a further form of the dialyzer of the present invention, generally referred to by numeral 76, wherein screwthreads are provided along the inner and outer surfaces of the cylindrical membrane 52 to provide helical paths along both surfaces of the membrane. The dialyzer 76 is of the same construction and materials as the dialyzer disclosed in FIG. 5 except that a screwthread 78 is formed directly in the wall of the recess 48, the peak of the thread 80 abutting in sealing relationship with the membrane 52. The screwthread is formed by heating and collapsing the glass housing 46 around a carbon rod, not shown, which has a screwthread formed on the outer surface thereof. After the glass wall of the housing 46 has cooled, the carbon rod is unthreaded from the housing, thus leaving the recess 48 with the screwthread 78 formed therein. A dialyzer of this design was constructed having the same dimensions as the dialyzer described above in connection with FIG. 5 except that it was 4½ inches long and weighed 13 grams. Such dialyzer was tested in the glucose monitoring system of FIG. 1, with the various liquids flowing at the same rate as discussed above and with the sample flowing along the inner surface of the membrane 52 in co-current flow with the saline solution along the outer surface of the membrane. The screwthreads on opposite sides of the dialysis membrane of the dialyzer 76 had the same pitch, that is, both were righthanded screwthreads, as illustrated in FIG. 7.

The trace F in the graph illustrated in FIG. 8 depicts the characteristics of the dialyzer illustrated in FIG. 7 operating under the above described conditions with the glucose concentration being 159 milligram percent glucose. It is seen that the fidelity of the trace F is slightly improved over that of traces E and D, and substantially better than trace B of a dialyzer having annular flow along both surfaces of a cylindrical dialysis membrane.

Also shown in FIG. 8 is a trace G of a well-known, standard style dialyzer having acceptable characteristics for use in a glucose monitor except for the fact of its substantial size and weight. The dialyzer, not shown, comprised a pair of circular, flat plates having a spiral groove formed in the adjacent faces thereof and separated by a flat dialysis membrane to form flow channels over opposite sides of the membrane. The trace G produced by such dialyzer had an efficiency somewhat greater than that of the dialyzer producing the trace F, although the difference was not sufficient as to be of any appreciable consequence in the use of the glucose monitoring system. Moreover, it should be pointed out that the tubular membrane utilized in the dialyzer of the type illustrated in FIG. 7 which produced the trace F had a thickness of 0.0025 inch compared with a 0.0007 inch membrane employed in the dialyzer which produced the trace G. Thus, it is understandable that the standard dialyzer would have greater efficiency than that of the type which produced trace F. It is clearly established by comparing traces F and G in FIG. 8 that the dialyzer of the type disclosed in FIG. 7 has characteristics almost identical to those in the standard dialyzer; yet, as stated above, the cylindrical dialyzer illustrated in FIG. 7 was only 4½ inches in length, had a diameter of only ⅜ of an inch, and weighed 13 grams, while the standard circular dialyzer had a diameter of 6¼ inches, a thickness of about 3 inches and weighed 690 grams.

FIG. 9 illustrates the preferred form of the dialyzer of the invention, generally referred to by numeral 82. In this embodiment of the invention, the housing 46 is formed of an elastomeric material, such as silicone rubber, rather than glass as in the previously described embodiments. The inner wall of the housing 46 is provided with a screwthread 84 formed by casting silicone rubber over a suitable form. As seen in FIG. 9, the screwthread 84 has a pitch opposite to that of the screwthread 66 on the Teflon core 50. This construction has the advantage that the fragile glass housing is replaced by silicone rubber which, being elastic, can be made with an inner diameter slightly undersize so that it presses the membrane firmly in place on the thread 66 of the core 50. Also, since the housing 46 is elastomeric, the core 50 with the cylindrical membrane 52 may be more easily inserted into the threaded housing 46 without damaging the membrane than when a rigid glass housing is employed.

The dialyzer described above in connection with FIG. 9 was employed in the glucose monitoring system illustrated in FIG. 1 with a 200 milligram percent glucose sample solution flowing along the inner surface of the membrane 52 and the saline solution flowing along the same direction along the outer surface of the membrane to provide concurrent flow. The dialyzer had a length of 4 inches, an outer diameter of 1⅜ inch and weighed 120 grams. The characteristics of such a dialyzer are depicted by trace C in FIG. 4, referred to previously. It is seen that trace C is almost in the form of a rectangle, thus having almost perfect fidelity besides high efficiency.

It can be appreciated from the above description that each of the dialyzers of the present invention are more compact and lightweight than the conventional flat dialyzer having spiral grooves in the surfaces of two flat plates with the plates separated by a flat membrane. In addition, the dialyzers of the invention are easy to assemble and disassemble and have efficiency and fidelity characteristics comparable to and in some cases better than that of the conventional dialyzer, and considerably improved over a dialyzer in which there is provided annular fluid flow along both the inner and outer surface of a tubular membrane, such as a dialyzer having the characteristics depicted by trace B in FIG. 4. Thus, the dialyzer of the present invention lends itself favorably for use in those applications where small, lightweight dialyzers are required which must be efficient, and highly responsive, such as in the case of a portable glucose monitor. It is understood, however, that the dialyzers of thhe invention may be utilized in numerous other applications, such as in other analytical instruments, as well as in the purification and treatment of the blood of living subjects.

What is claimed is:

1. In a dialysis apparatus having a housing with a cylindrical recess therein, a cylindrical core positioned coaxially in said recess, a cylindrical dialysis membrane surrounding said core, means defining liquid flow paths extending lengthwise along the inner and outer surfaces, respectively, of said cylindrical membrane, inlet and outlet passages in said housing and said core in flow communication with said flow paths, the improvement comprising:
   said housing being formed of a resilient material;
   a screw thread formed in the wall of said recess providing the flow path along the outer surface of said membrane;
   a screw thread formed in the surface of said core providing the flow path along the inner surface of said membrane;
   the peaks of said screw threads being in sealing relationship with the outer and inner walls, respectively, of said membrane;
   the screw thread formed in said core having a pitch opposite to the pitch of the screw thread in said recess; and
   a single annular sealing ring surrounding said core at each end thereof and securing the ends of said cylindrical membrane to said core in sealing relationship therewith, and the outer surface of each annular sealing ring being in sealing relationship with the wall of said recess in said housing.

2. In a dialysis apparatus having a housing with a cylindrical recess therein, a cylindrical stationary core positioned coaxially within said recess, a cylindrical dialysis membrane surrounding said core means defining liquid flow paths extending lengthwise along the inner and outer surfaces, respectively, of said cylindrical membrane, and inlet and outlet passages in said housing and said core in flow communication with said flow paths, the improvement comprising: at least one of said flow path defining means being shaped to provide a helical flow path along the surface of said cylindrical membrane, a single resilient annular ring surrounding said core at each end thereof, each ring securing an end of said cylindrical membrane to said core in sealing relationship therewith and sealing at its outer surface to the wall of the recess in said housing whereby said rings define the limits of the outer flow path of the apparatus.

3. In a dialysis apparatus having a housing with a cylindrical recess therein, a cylindrical stationary core positioned coaxially within said recess, a cylindrical dialysis membrane surrounding said core, means defining liquid flow paths extending lengthwise along the inner and outer surfaces, respectively, of said cylindrical membrane, and inlet and outlet passages in said housing and said core in flow communication with said flow paths, the improvement comprising: both of said flow path defining means being screw threads, one of said screw threads being formed in the surface of said core and the other of said screw threads being formed in the wall of said recess, with the peaks of said screw threads being in sealing relationship with the inner and outer surfaces, respectively, of said membrane, said screw thread formed in said core having a pitch opposite to the pitch of the screw thread in said recess, and said housing being formed of a resilient material.

References Cited

UNITED STATES PATENTS

| 2,276,986 | 3/1942 | Kemp et al. | 210—22 X |
| 2,664,395 | 12/1953 | Marchand | 210—321 |
| 2,987,472 | 6/1961 | Kollsman | 210—321 X |
| 3,291,568 | 12/1966 | Sautter | 23—258.5 |
| 3,337,051 | 8/1967 | Kerschner et al. | 210—304 X |
| 2,687,997 | 8/1954 | Marchand | 210—321 |
| 3,389,797 | 6/1968 | Giardini | 210—304 X |
| 3,400,825 | 9/1968 | Shippey | 210—321 |

FOREIGN PATENTS

| 1,354,936 | 2/1964 | France. |
| 847,182 | 2/1953 | Germany. |
| 291,180 | 9/1953 | Switzerland. |

REUBEN FRIEDMAN, Primary Examiner

F. A. SPEAR, Jr., Assistant Examiner

U.S. Cl. X.R.

210—450